US012622827B2

(12) United States Patent
Kauffmann et al.

(10) Patent No.: US 12,622,827 B2
(45) Date of Patent: May 12, 2026

(54) MUSCLE-POWERED WHEELCHAIR AND METHOD FOR CONTROLLING AN AUXILIARY DRIVE FOR SAME

(71) Applicant: Motion Advantage Verwaltungs-GmbH, Balingen (DE)

(72) Inventors: Harald Kauffmann, Balingen (DE); Thomas Birmanns, Balingen (DE)

(73) Assignee: Motion Advantage Verwaltungs-GmbH (DE)

( * ) Notice: Subject to any disclaimer, the term of this patent is extended or adjusted under 35 U.S.C. 154(b) by 55 days.

(21) Appl. No.: 18/370,485

(22) Filed: Sep. 20, 2023

(65) Prior Publication Data

US 2024/0099913 A1     Mar. 28, 2024

(30) Foreign Application Priority Data

Sep. 23, 2022    (DE) ..................... 10 2022 124 524.1

(51) Int. Cl.
*A61G 5/04*        (2013.01)
*G01D 5/14*        (2006.01)
*G01L 1/22*        (2006.01)

(52) U.S. Cl.
CPC ............. *A61G 5/045* (2013.01); *G01D 5/145* (2013.01); *G01L 1/22* (2013.01)

(58) Field of Classification Search
None
See application file for complete search history.

(56) References Cited

U.S. PATENT DOCUMENTS

| | | | | |
|---|---|---|---|---|
| 4,050,533 A | * | 9/1977 | Seamone | A61G 5/1054 180/907 |
| 5,306,035 A | * | 4/1994 | Counts | A61G 5/0825 280/270 |
| 5,732,786 A | * | 3/1998 | Fujigaki | B60L 58/21 180/19.3 |
| 5,818,189 A | * | 10/1998 | Uchiyama | A61G 5/1054 318/432 |
| 6,112,837 A | | 9/2000 | Kanno et al. | |
| 2005/0189732 A1 | * | 9/2005 | Morndal | B62B 5/02 280/43 |
| 2007/0284845 A1 | * | 12/2007 | Roovers | A61G 5/045 180/315 |
| 2009/0139724 A1 | * | 6/2009 | Gray | E21B 47/001 166/345 |
| 2012/0068435 A1 | * | 3/2012 | Birmanns | A61G 5/048 702/19 |

FOREIGN PATENT DOCUMENTS

| | | |
|---|---|---|
| DE | 19848530 | 2/2000 |
| DE | 202008017258 | 4/2009 |
| DE | 202016100975 | 7/2017 |
| DE | 102017222036 | 6/2019 |
| EP | 0995415 | 4/2000 |
| EP | 2277487 | 1/2011 |

* cited by examiner

*Primary Examiner* — Daniel L Greene
*Assistant Examiner* — Daniel L. Greene, Jr.
(74) *Attorney, Agent, or Firm* — Pandiscio & Pandiscio

(57)           ABSTRACT
A wheelchair having at least one force element that is elastically deformable, wherein deformation of the at least one force element becomes more and more intense with the application of increasing force, resulting in natural damping of the coupled-in force, which may be detected by a sensor such that the wheelchair according to the invention may be controlled in a targeted manner for fine movements as well as for faster, coarser movements.

16 Claims, 5 Drawing Sheets

1

MUSCLE-POWERED WHEELCHAIR AND METHOD FOR CONTROLLING AN AUXILIARY DRIVE FOR SAME

REFERENCE TO PENDING PRIOR PATENT APPLICATION

This patent application claims benefit of German Patent Application No. 10 2022 124 524.1, filed Sep. 23, 2022, which patent application is hereby incorporated herein by reference.

FIELD OF THE INVENTION

The present invention relates to a muscle-powered wheelchair with an auxiliary drive, comprising two drive wheels with wheel rims and electrical drive means, a push rim being associated with each of the wheel rims by means of at least two connecting elements that are distributed over the circumference of the drive wheels, and to a method for controlling an auxiliary drive for same.

BACKGROUND OF THE INVENTION

Such a wheelchair is previously known from the disclosure of DE 198 48 530 C1. This wheelchair is based on a concentric push rim bearing, situated at the wheel circumference, and a sensor element with spring pretensioning that holds the sensor in a neutral position. When a user pushes the push rim forward, for example, the push rim moves in relation to the wheel rim, while the suspension of the push rim detects the associated direction. The connecting element goes into an inclined position, thereby triggering a switch that initiates a drive of the wheelchair for forward travel.

Other systems have a support of the push rim in the center of the wheel, i.e., in the hub motor. One design is described in DE 697 19 432 T2. The push rim is fastened at the inside to a rotatable disk by means of three spoke-like struts. This rotatable disk is elastically supported on the hub body via springs.

Further prior art is already known from DE 20 2016 100 975 U1 and EP 0 995 415 A2.

A first problem of previously known designs is that for the force-related deflection of the push rim, spring pretensioning of the push rim bearing must initially be overcome before a measuring signal is generated, which results in a travel signal at the drive. This spring pretensioning may be fairly high, depending on the design. Most approaches use a less precise bearing of the push rim, since this bearing must withstand all typical loads on a wheelchair. In particular radial and axial shocks and impacts on the push rim may occur, for example when traveling against an obstacle or when the wheel, removed from the wheelchair, falls off during loading into an automobile. This robustness is usually recovered using a bearing which is designed for such a load and which is correspondingly tight. In turn, resetting and centering such a tight bearing may be achieved only with appropriately great spring pretensioning.

A second problem results for the case that spring pretensioning that is greater on one side preferentially pretensions the push rim more intensely in a first direction than in a second direction. As a result, equal forces that are introduced by the user may result in travel signals of different intensities, depending on whether they are generated in the first rotational direction or in the second rotational direction. This may have undesirable effects for use of the wheelchair, in particular when the wheelchair has two identical wheels that may be mounted on the left side or also on the right side of the wheelchair, and these wheels are mounted on the wheelchair with different pretensioning on the left side than on the right side. Thus, merely becoming acclimated to this error is not possible.

A third problem is the deflection of the push rim against a hard stop. After the spring pretensioning is overcome, a brief deflection in the active sensor field occurs, which is usually followed by a hard stop of the push rim at the maximum deflection. This results in an undefined haptic sensation for the wheelchair rider, which leads to uncertainty and makes it difficult to generate an appropriately metered signal generation.

Some of the previously known approaches have attempted to eliminate this by use of so-called flexible mechanisms. A flexible mechanism is a mechanism that achieves a transfer of force and movement by elastic body deformation. This mechanism gains all or part of the movement from mutual flexibility of its members, and not just from the movement of rigid body joints. Such a mechanism, which combines multiple parallel spring elements to form a flexible mechanism, is known form EP 2 277 487 B1. These spring elements are mounted at the circumference of the wheel rim of the wheelchair wheel in various designs, and are thus intended to bring about a rotational movement, and at the same time a concentric movement, of the push rim. However, the problem here is that each of these flexible mechanisms acts as an individual spring. Thus, the introduced force is not redirected into a concentric movement, but instead, is only diverted to the next flexible element due to the overall flexibility of the wheelchair wheel and the push rim. From there, the force is distributed over the entire system and results in deformation of the system, and results less in the targeted concentric deflection of the push rim. Only in a theoretically completely rigid design without any flexibility would it be possible for a purely rotational movement of the push rim to occur which generates an equally large signal swing due to an introduction of force at any given location at the circumference.

DE 10 2017 222 036 A1 proposes a bearing, as a flexible mechanism, which resembles a double bending beam of a load cell. However, the above-mentioned problem likewise occurs here. In addition, use of such a design in which each of the bearings is designed as a double bending beam with a sensor unit is not economically feasible.

SUMMARY OF THE INVENTION

Against this background, the object underlying the present invention is to provide a muscle-powered wheelchair which allows precise detection of the introduced muscular power, but which is still sufficiently robust to operate the wheelchair in everyday situations, and which has no hard stop despite a small actuating travel path. Also proposed is a method for operating such a wheelchair which achieves this object.

This is achieved by a muscle-powered wheelchair according to the features of one aspect of the invention, and by a method for operating such a wheelchair according to the features of another aspect of the invention. Meaningful embodiments of the wheelchair and of the method are discussed below.

According to the invention, a muscle-powered wheelchair with an auxiliary drive is provided, comprising two drive wheels with wheel rims and electrical drive means, a push rim being associated with each of the wheel rims by means of at least two connecting elements that are distributed over the circumference of the drive wheels, the wheel rims or the push rims forming an elastically deformable force element with which at least one signal generator is associated, the signal generator detecting an elastic deformation of the force element in the radial direction and generating a travel signal corresponding to the degree of deformation of the force element, the at least one signal generator on the input side being in signal connection with a control unit, which in turn on the output side is in signal connection with control inputs of the electrical drive means.

Due to the elastic deformability, the user may introduce forces into at least one such force element which result in a geometric deflection of the push rim with respect to the wheel rim, or vice versa, which in turn is detected by the signal generator. This may take place in different ways, depending on the type of measuring method, in particular by use of sensors for force measurement, provided that elongation, compression, or bending is involved in the operation; in these cases it is also possible to carry out a path measurement. In particular for bending, the resistance may be detected with a strain gauge, for example, or otherwise via an angular measurement; this list is not intended to be exhaustive.

Due to the finite elasticity of the material of the at least one force element, the resistance increases with increasing deflection, so that a hard stop does not result; rather, the finite elasticity represents increasing damping. This damping ensures that an actual stop is never reached, and also cannot irritate the user. The deflection may thus be kept small, even for fairly large forces, so that a precise measurement of the deflection still results in coverage of a large signal range, so that very fine movements as well as very intense movements may be detected.

The connecting elements may preferably be articulatedly connected to each of the wheel rims by means of a first pivot bearing, and to the push rim by means of a second pivot bearing. The push rim supported in this way is completely statically determinate, and in a rigid system would be immovable. The deflection of the push rim brings about swiveling of the connecting member from a neutral position into a deflection in a forward direction or a backward direction, which results in a deformation of either the push rim or of the wheel rim, depending on which of these parts is designed as a force element. The use of elastically deformable materials such as spring steel may result in a design of one of these parts as a force element. In a completely rigid system, without the possibility of elastic deformation of the push rim or of the wheel rim, no deflection of the push rim with respect to the wheel rim would be possible. The push rim may be deflected due to these elasticities of the system, primarily due to the elasticity of the force element.

Introducing a force onto the push rim in the rest state, i.e., perpendicularly with respect to the orientation of the connecting element, brings about a theoretically infinitely high resultant force in the radial direction of the push rim. With increasing deflection of the push rim, the radial force component is reduced according to a sinusoidal function. This means that the system close to the rest state responds very sensitively to introduced forces, resulting in the desired sensitivity. The farther the push rim is deflected, the higher are the forces that are necessary for a further deflection. Different force deflection characteristic curves may thus be achieved as a function of the rigidity of the force element, which ultimately is to be equated with a spring constant.

In a further preferred embodiment, the first pivot bearing and/or the second pivot bearing may be designed as a roller bearing. Roller bearings, in particular for a pretensioned system, have the advantage of eliminating the so-called stick-slip effect. This effect may occur when conventional slide bearings are used, and prevents sensitivity due to the fact that a minimum force is necessary for overcoming this effect. With roller bearings, the introduced force is translated directly into movement.

In particular, the connection between a push rim and a wheel rim may be designed in such a way that the connecting elements are connected to the push rim by means of a push rim bracket that points radially inwardly or outwardly from the push rim, or are connected to the wheel rim by means of a bearing point that points radially outwardly or inwardly from the wheel rim. The push rim is thus practically suspended in front of the wheel rim when engaged by the user, but is held in a defined manner when at least two connecting elements are used. Three or more connecting elements that are uniformly distributed over the circumference of the push rim and the wheel rim are particularly preferably used in order to ensure a centered deformation of the force element that functions identically in all rotational positions of the wheel.

With regard to the evaluation of the deflection of the connecting element, it may particularly preferably be provided that the at least one signal generator is a Hall probe which is situated at the wheel rim or at the push rim and faces a connecting element, and which detects a movement of a magnet situated at this connecting element. Due to the fact that the Hall probe is a measuring unit and not a switching contact, the position of the magnet may be deduced from the intensity of the magnetic field. The connecting element may advantageously have an elongated design and bear the magnet at one end, while the Hall probe is fixedly situated at the push rim or the wheel rim. Due to the deflection, the magnet sweeps past the Hall probe and partially leaves its measuring range, so that a signal of the magnet that is generated by the Hall effect becomes weaker with increasing deflection. An electrical signal that is output by the Hall probe is similarly affected. A movement direction may be deduced either by an additional sensor system or by a spatial resolution of the Hall sensor, or also by arranging multiple neighboring Hall sensors and comparing their measured values.

Alternatively, it may also be provided that the at least one signal generator is a bending beam or a double bending beam, on the outer side of which a strain gauge is situated. These have the advantage that this is a "zero path sensor" in a manner of speaking, since the deformation of such systems remains below human perceptibility. Further sensors such as magnetostrictive, magnetoresistive, inductive, optical, and other sensors are conceivable. It is irrelevant whether the sensor is situated at the bearing point or outside it.

In addition, multiple signal generators may advantageously be provided, preferably one signal generator at each connecting element. In this way, signals other than pure travel signals may be generated via the push rims. For the pure travel signal, the multiple sensors deflect in the same direction and by the same extent, resulting in uniform signals. An electronics system may identify them as travel signals. However, if a radial force, for example, were to act on the push rim, the multiple sensors would generate different signals. On the one hand, errors in the deflection may be detected in this way, for example for collisions with obstacles. On the other hand, however, signals may also be generated in a targeted manner for further commands. Corresponding pulses such as radial knocking, pulling, or pushing on and off may be recognized by use of algorithms and utilized as an input command for various setting options.

In one alternative embodiment of the force element, it may be provided that the connecting elements form elastically deformable force elements with which at least one signal generator is associated, the signal generator detecting an elastic deformation of the force element in its longitudinal direction and generating a travel signal corresponding to the degree of deformation of the force element, the at least one signal generator on the input side being in signal connection with a control unit, which in turn on the output side is in signal connection with control inputs of the electrical drive means. In this case, the connecting element is not necessarily rotatably supported, and instead may also represent a resilient bearing, so that the connecting element deflects when a thrust force is introduced into the push rim.

In such a case, the at least one signal generator may particularly preferably be a strain gauge that can evaluate and detect the deflection of the elastically deformable connecting element.

In one preferred embodiment, the present invention may also be configured for operation by hemiplegics. Since hemiplegics operate the wheelchair with only one arm, in such a case a push rim on the side on which operation cannot take place may be omitted if necessary. Operation then takes place only via the one push rim on the side at which it is mounted.

The above-described invention is explained in greater detail below with reference to one exemplary embodiment.

DETAILED DESCRIPTION OF THE PREFERRED EMBODIMENTS

Figure 1:
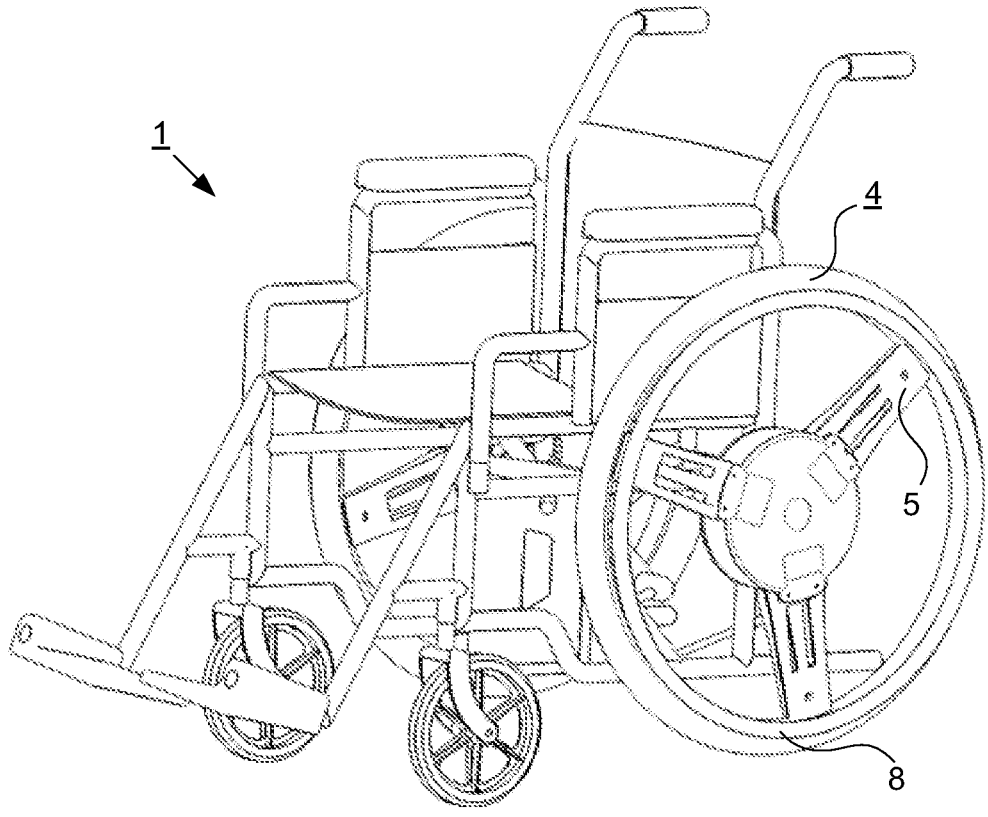
FIG. 1 shows a muscle-powered wheelchair with push rims suspended on the wheel rims, in a perspective illustration.
Figure 6:
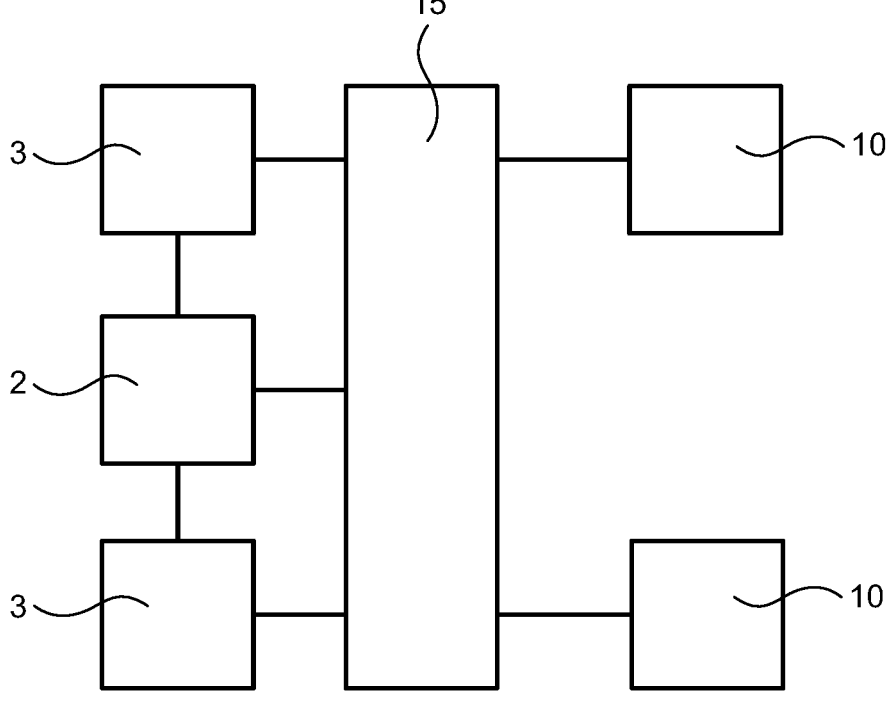
FIG. 6 shows a connection diagram with sensors, actuators, and a control unit.

FIG. 1 shows a muscle-powered wheelchair 1 that is equipped with two drive wheels 4. These drive wheels 4 have push rims 8 that are suspended on wheel rims 5 of the drive wheels 4. By means of the push rims 8, a user of the wheelchair 1 may introduce muscular power into the drive wheels 4 in order to move the wheelchair 1 forward. The wheelchair 1 has an auxiliary drive which couples an additional force contribution to the coupled-in muscular power in order to assist the user with the drive of the wheelchair 1. For this purpose, the drive wheels 4 each have a hub motor, not shown here, as an electrical drive means 3 that is fed via an energy store 2. Provided as an energy store 2 are storage batteries which may be charged by recuperation during downhill travel or by an external charging voltage. The wiring of the drive means 3 and of the energy store 2 to further components is illustrated in greater detail in FIG. 6.

The suspension of the push rims 8 on the wheel rims 5 of the drive wheels 4 takes place at bearing points 6 of the wheel rims 5, which are uniformly distributed over the circumference thereof. Three bearing points 6 are preferably provided, since this allows a defined bearing of the push rim 8, but also permits sufficient freedom for a deformation of the push rim 8. This is necessary due to the fact that in the present example, the push rim 8 serves as a force element which is used as damping during the introduction of muscular power, but which allows a displacement of the push rim 8 relative to the wheel rim 5.

Figure 3:
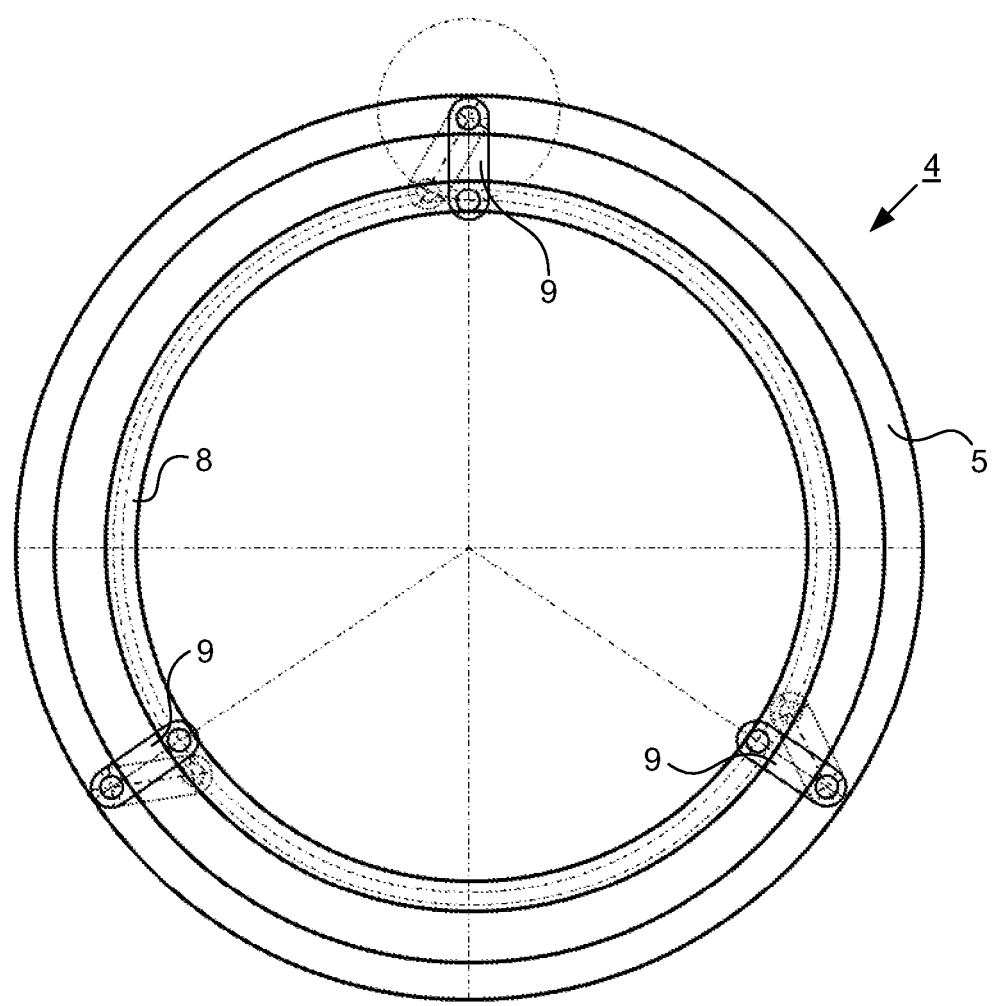
FIG. 3 shows a push rim suspended on a wheel rim, in a schematic top view.

When the user pushes against the wheelchair 1 by introducing muscular power into a push rim 8, initially the push rim 8 moves forward in the direction of the introduced force. Due to the uniform bearing of the push rim 8 at push rim brackets 7 corresponding to the bearing points 6, the forward movement is converted into a rotational movement. However, this movement is hindered by connecting elements 9 that each connect a push rim bracket 7 to a bearing point 6. Although the connecting element 9 is connected to the bearing point 6 via a first pivot bearing 11, and to the push rim bracket 7 via a second pivot bearing 12, and the push rim 8 in this regard is suspended only via joints, a deflection of the connecting elements 9, as shown in FIG. 3, ensures an enlargement of the radius of a circle via the particular second pivot bearing 12. If only rigid elements were used in the system, this movement as a whole would be completely rigid, despite the joints. However, due to the push rim 8 being designed as an elastically deformable force element, for example by manufacturing the push rim 8 from spring steel, the push rim 8 is able to deform, thus allowing a deflection of the connecting elements 9, which may then be detected. The push rim 8 due to its deformation acts as damping, so that a slight deformation initially allows a comparatively strong deflection, while with increasing force, the deflection becomes ever more difficult to increase. Therefore, the user will not go into a hard stop, so that the operation of the wheelchair is very comfortable and very uniform.

Figure 2A:
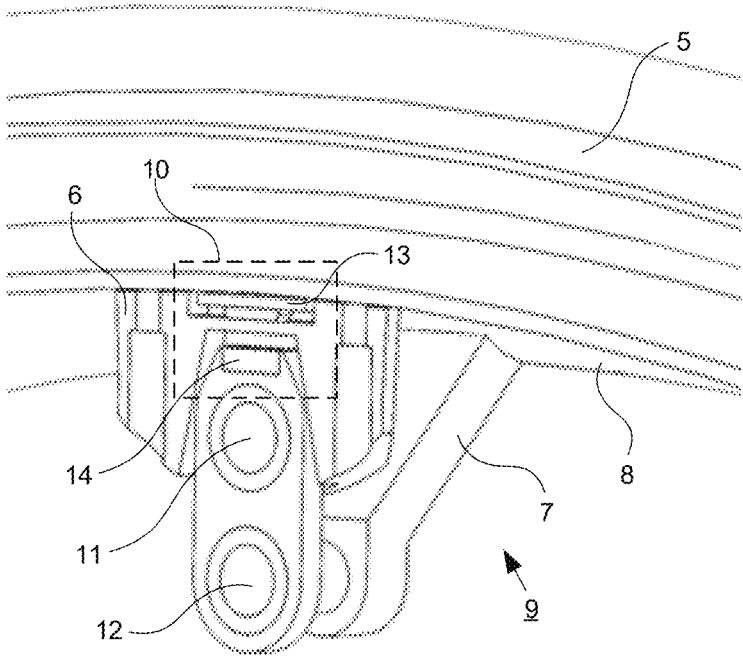
FIG. 2a shows a detail of the suspension of a push rim at a wheel rim, together with a cross section of a connecting element in the neutral position, in a perspective partial cross-sectional illustration.
Figure 2B:
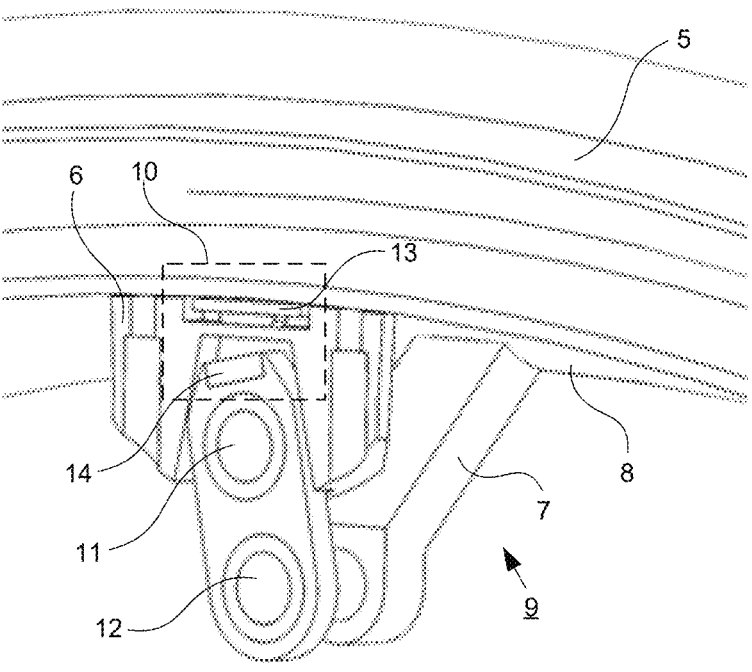
FIG. 2b shows the detail according to FIG. 2a in a deflection of the connecting element.

As shown in FIG. 2a, a magnet 14 that is present in the measuring range of a Hall probe 13, opposite from the magnet 14, is situated at one end of the connecting element 9. FIG. 2a shows the neutral position of the push rim 8 without deflection relative to the wheel rim 5, so that the magnet 14 is situated centrally above the Hall probe 13. If the push rim 8 is now pushed to the right in the illustration, the connecting means 9 deflects, on the one hand by the push rim 8 compressing, and on the other hand by the connecting means 9 simultaneously rotating about the first pivot bearing 11 with respect to the wheel rim 5, and about the second pivot bearing 12 with respect to the push rim 8. As a result, the magnet 14 moves in the sensor range of the Hall probe 13, so that the magnetic field of the Hall probe changes, and an electrical output signal is generated that corresponds to the degree of elastic deformation of the push rim 8.

Figure 4:
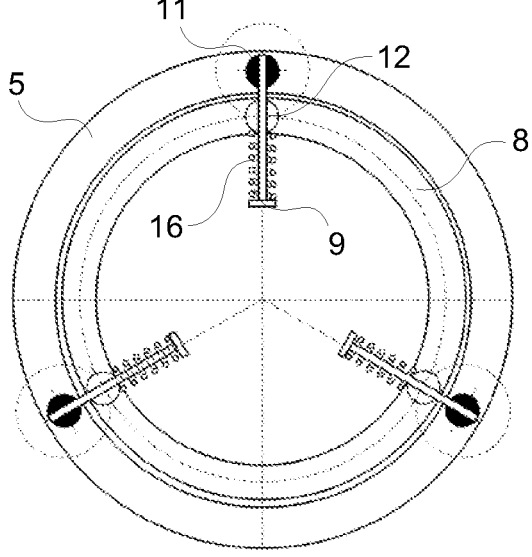
FIG. 4 shows a push rim suspended on a wheel rim via compressible connecting elements, in a rest position.
Figure 5:
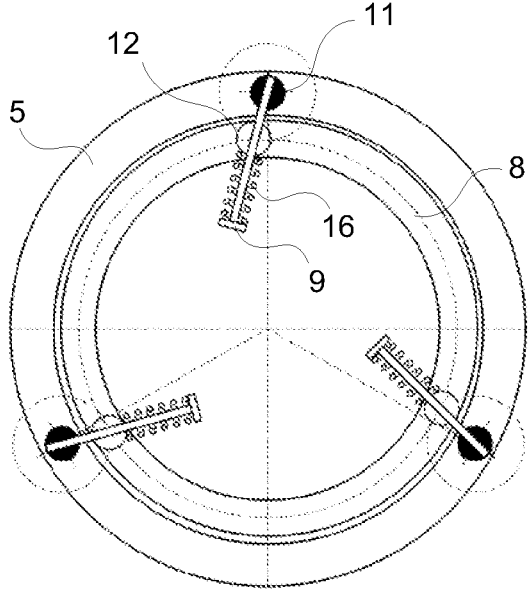
FIG. 5 shows the push rim according to FIG. 4 in a deflected position.

FIGS. 4 and 5 show one alternative in which the push rim 8 or the wheel rim 5 is not deformed or not solely deformed; rather, the deformation takes place primarily in the connecting elements 9. An example of compression of a compression spring 16 that is provided in the connecting elements 9 for this purpose is shown. The degree of compression of the compression spring may be determined via a path sensor, for example, when a deflection of the connecting elements 9 results from a movement of the push rim 8. In this regard, if the push rim 8 in FIG. 5 is deflected to the left relative to its position in FIG. 4, the connecting elements 9 rotate in their first pivot bearings 11 and second pivot bearings 12, whereby the pivot bearings 11 and 12 move away from one another. The compression spring 16 is compressed due to the fixed absolute length of the connecting means 9. However, this compression occurs elastically and thus reversibly, and also nonlinearly, so that the push rim 8 must be deflected against increasingly growing spring pressure, and resets after being released.

Firstly, two signal generators 10, namely, one for each drive wheel 4, are sufficient for the entire wheelchair 1. Multiple signal generators 10 for each drive wheel 4 are possible, and then allow pressure signals and knocking signals on the push rim 8 to be converted into control signals. For this purpose, the signal generators 10 together with a control unit 15 of the wheelchair 1 are in signal connection, and relay measured signals, for example in the form of electrical output signals of Hall probes 13 used, to the control unit 15. Provided on the output side of the control unit 15 are electrical drive means 3, for example in the form of hub motors, which are activated corresponding to the signals of the signal generators 10. The drive means 3 as well as the control unit 15, and via the control unit, the signal generators 10, are supplied with voltage from an energy store 2.

Thus, a muscle-powered wheelchair is described above which allows precise detection of the introduced muscular power, but which is still sufficiently robust to operate the wheelchair in everyday situations, and which has no hard stop despite a small actuating travel path. Also described is a method for operating such a wheelchair which achieves this object.

LIST OF REFERENCE NUMBERS 1 wheelchair
2 energy store
3 drive means
4 drive wheel
5 wheel rim
6 bearing point
7 push rim bracket
8 push rim
9 connecting element
10 signal generator
11 first pivot bearing
12 second pivot bearing
13 Hall probe
14 magnet
15 control unit
16 compression spring

What is claimed is:

1. A wheelchair comprising:
at least one drive wheel (4), wherein the at least one drive wheel (4) comprises a wheel rim (5);
an electrical drive means (3) connected to the at least one drive wheel (4) and configured to selectively rotate the at least one drive wheel (4) in response to a travel signal;
at least one elastically deformable push rim (8) mounted to the wheel rim (5) by at least two connecting elements (9) distributed about the circumference of the at least one drive wheel (4), wherein each of the at least two connecting elements (9) comprises a longitudinal axis extending between the location at which each of the at least two connecting elements (9) is mounted to the at least one push rim (8) and the location at which each of the at least two connecting elements (9) is mounted to the wheel rim (5), and further wherein at least one of the at least two connecting elements comprises a signal generator (10);
wherein each of the at least two connecting elements (9) is configured to pivot about at least one pivot bearing upon the deformation of the at least one push rim (8) resulting from the application of force to the at least one push rim (8) in a direction generally perpendicular to the longitudinal axis of the at least two connecting elements;
wherein the signal generator is configured to generate a travel signal corresponding to the degree of deformation of the at least one push rim where the at least one push rim is mounted to the at least two connecting elements (9); and
wherein the travel signal is transmitted to a control unit (15), and further wherein the control unit (15) activates the electrical drive means (3) so as to selectively rotate the at least one drive wheel (4).

2. The wheelchair according to claim 1, wherein each of the connecting elements (9) are articulatedly connected to (i) the wheel rim (5) by means of a first pivot bearing (11), and (ii) to the at least one push rim (8) by means of a second pivot bearing (12).

3. The wheelchair according to claim 2, wherein at least one of the first pivot bearing (11) and/or the second pivot bearing (12) comprises a roller bearing.

4. The wheelchair according to claim 1, wherein the at least two connecting elements (9) are connected to the at least one push rim (8) by means of a push rim bracket (7) that points radially inwardly or outwardly from the push rim (8), or are connected to the wheel rim (5) by means of a bearing point (6) that points radially outwardly or inwardly from the wheel rim (5).

5. The wheelchair according to claim 1, wherein the signal generator (10) is a Hall probe (13) which is situated at the wheel rim (5) or at the push rim (8) and faces a connecting element (9), and which detects a movement of a magnet (14) situated at this connecting element (9).

6. The wheelchair according to claim 1, characterized in that the signal generator (10) comprises a bending beam and a strain gauge.

7. The wheelchair according to claim 1, wherein the signal generator (10) comprises at least one selected from the group consisting of a magnetostrictive sensor, a magnetoresistive sensor, an inductive sensor, and an optical sensor.

8. A wheelchair comprising:
at least one drive wheel (4), wherein the at least one drive wheel comprises a wheel rim (5);
an electrical drive means (3) connected to the at least one drive wheel (4) and configured to selectively rotate the at least one drive wheel (4) in response to a travel signal;
at least one elastically deformable push rim (8) mounted to the wheel rim (5) by at least two connecting elements (9) distributed about the circumference of the at least one drive wheel (4);
wherein each of the at least two connecting elements (9) comprises a longitudinal axis extending between the location at which each of the at least two connecting elements (9) is mounted to the at least one push rim (8) and the location at which each of the at least two connecting elements (9) is mounted to the wheel rim (5), and further wherein at least one of the at least two connecting elements comprises a signal generator (10);

wherein at least one of the at least two connecting elements (9) comprises an elastically deformable force element, and further wherein the signal generator is configured to detect elastic deformation of the force element along the longitudinal axis of the connecting element, and to generate a travel signal corresponding to the degree of deformation of the force elements;

wherein the travel signal is transmitted to a control unit (15), and further wherein the control unit (15) activates the electrical drive means (3) so as to selectively rotate the at least one drive wheel (4).

9. The wheelchair according to claim 8, wherein each of the connecting elements (9) are articulatedly connected to (i) the wheel rim (5) by means of a first pivot bearing (11), and (ii) to the push rim (8) by means of a second pivot bearing (12).

10. The wheelchair according to claim 9, wherein at least one of the first pivot bearing (11) and the second pivot bearing (12) comprises a roller bearing.

11. A method for controlling an auxiliary drive for a wheelchair comprising:

providing a wheelchair (1) comprising:

at least one drive wheel (4), wherein the at least one drive wheel (4) comprises a wheel rim (5);

an electrical drive means (3) connected to the at least one drive wheel (4) and configured to selectively rotate the at least one drive wheel (4) in response to a travel signal;

at least one elastically deformable and push rim (8) mounted to the wheel rim (5) by at least two connecting elements (9) distributed about the circumference of the at least one drive wheel;

wherein each of the at least two connecting elements (9) comprises a longitudinal axis extending between the location at which each of the at least two connecting elements (9) is mounted to the at least one push rim (8) and the location at which each of the at least two connecting elements (9) is mounted to the wheel rim (5), and further wherein at least one of the at least two connecting elements comprises a signal generator (10);

wherein each of the at least two connecting elements (9) is configured to pivot about at least one pivot bearing upon the deformation of the at least one push rim (8) resulting from the application of force to the at least one push rim (8) in a direction generally perpendicular to the longitudinal axis of the at least two connecting elements;

wherein the signal generator (10) is configured to generate a travel signal corresponding to the elastic deformation of the at least one push rim where the at least one push rim is mounted to the at least two connecting elements (9);

transmitting the travel signals generated by the signal generator (10) to a control unit (15) to control the electrical drive means (3); and activating the electrical drive means (3) by the control unit (15), whereby to rotate the at least one drive wheel (4).

12. The method according to claim 11, wherein the the wheel rim (5) is deformable, and further wherein deformation of the wheel rim (5) applies force to the plurality of connecting elements (9).

13. The method according to claim 12, wherein a deflection, in the same direction, of the plurality of connecting elements (9) is converted by the control unit (15) into a travel signal in the rotational direction of the deflection.

14. The method according to claim 13, wherein the travel signal corresponds to the degree of deflection of the connecting element (9).

15. The method according to claim 13, wherein a deflection, in an opposite direction, of the plurality of connecting elements (9) is converted by the control unit (15) into a control signal.

16. A method for controlling an auxiliary drive for a wheelchair, the method comprising:

providing a wheelchair (1) comprising:

at least one drive wheel (4), wherein the at least one drive wheel comprises a wheel rim (5);

an electrical drive means (3) connected to the at least one drive wheel (4) and configured to selectively rotate the at least one drive wheel (4) in response to a travel signal;

at least one elastically deformable push rim (8) mounted to the wheel rim (5) by at least two connecting elements (9) distributed about the circumference of the wheel rim (5);

wherein each of the at least two connecting elements (9) comprises a longitudinal axis extending between the location at which each of the at least two connecting elements (9) is mounted to the at least one push rim (8) and the location at which each of the at least two connecting elements (9) is mounted to the wheel rim (5), and further wherein at least one of the at least two connecting elements comprises a signal generator (10);

wherein at least one of the at least two connecting elements (9) comprises an elastically deformable force element, and further wherein the signal generator is configured to detect elastic deformation of the force element along the longitudinal axis of the connecting element, and to generate a travel signal corresponding to the degree of deformation of the force element;

transmitting the travel signals generated by the signal generator (10) to a control unit (15) to control the electrical drive means (3) and activating the electrical drive means (3) by the control unit (15), whereby to rotate the at least one drive wheel (4).

* * * * *